HEAT AND MASS TRANSFER CHARACTERISTICS OF TURBULENT CONTACT ABSORBER
1 SQ. FT. CROSS SECTION
WATER RATE - A - 88 USGPM
B - 42 USGPM
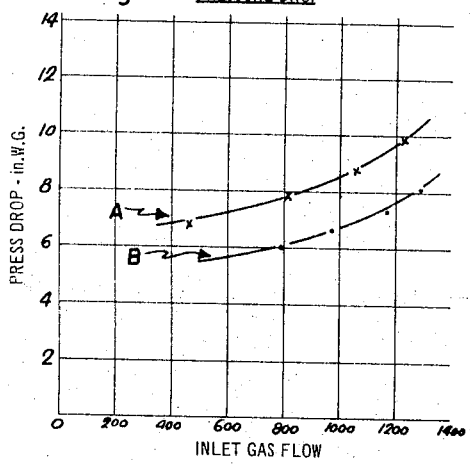
Fig. 7a PRESSURE DROP
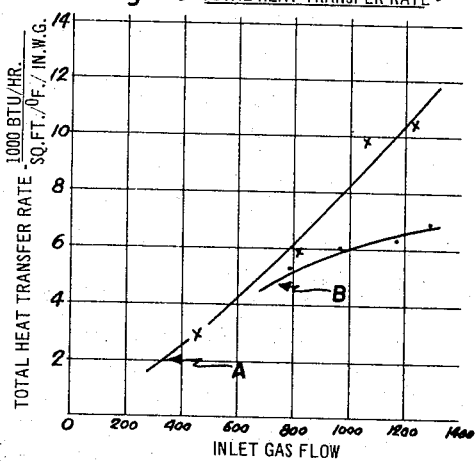
Fig. 7c TOTAL HEAT TRANSFER RATE
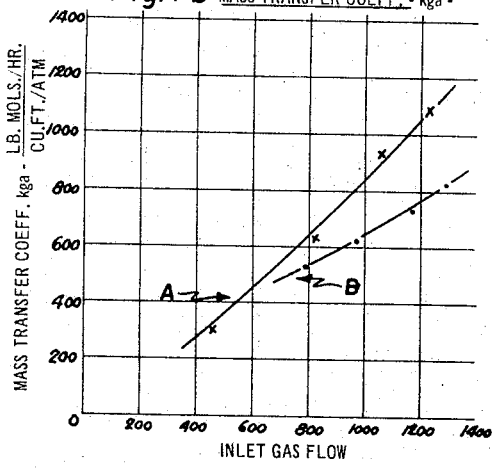
Fig. 7b MASS TRANSFER COEFF. - kga -
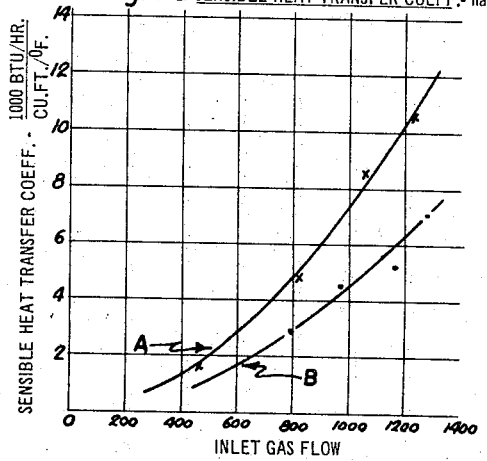
Fig. 7d SENSIBLE HEAT TRANSFER COEFF. - ha.
INLET GAS FLOW - FPM
Fig. 7

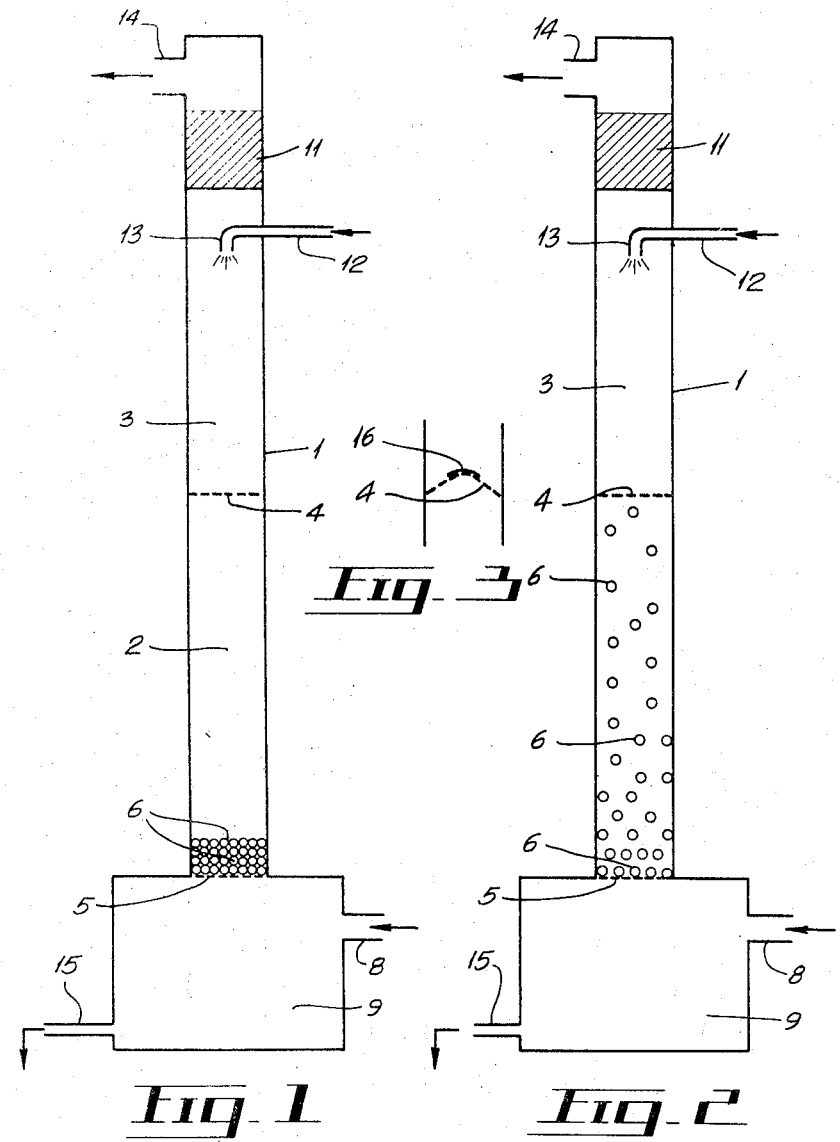

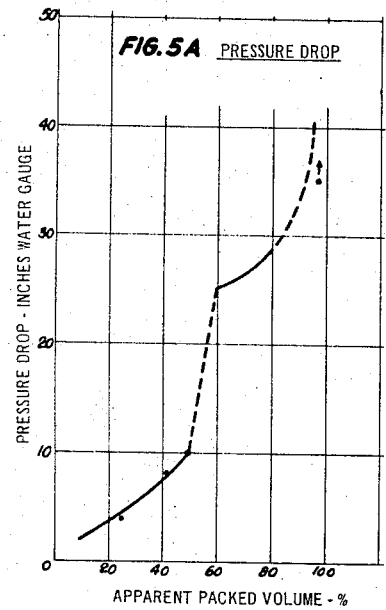
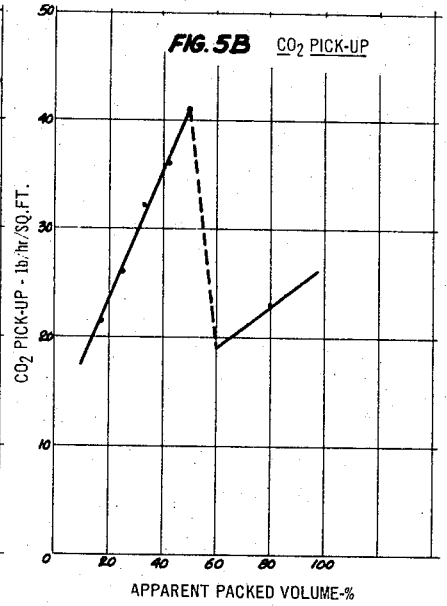
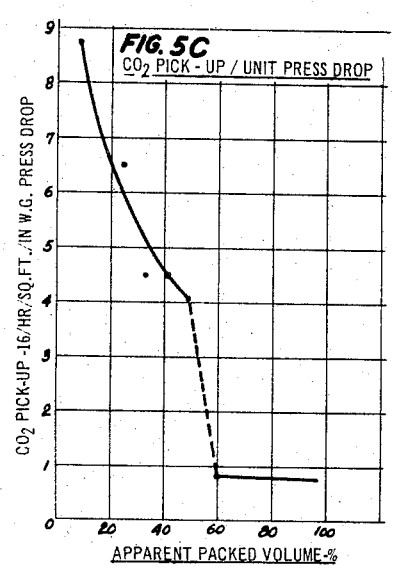
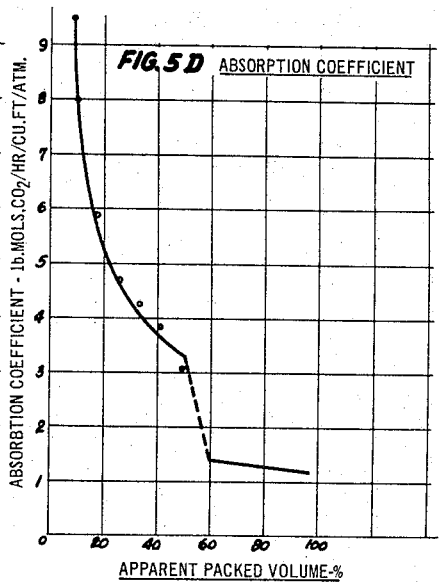
Fig. 5

United States Patent Office 3,350,075
Patented Oct. 31, 1967

3,350,075
METHOD FOR CONTACTING FLUIDS IN COUNTERCURRENT
Harold Roy Douglas, Hudson Heights, Quebec, Canada, assignor to Domtar Limited, Montreal, Quebec, Canada, a company of Canada
Filed Sept. 13, 1962, Ser. No. 223,367
Claims priority, application Great Britain, Dec. 14, 1961, 44,773/61
10 Claims. (Cl. 261—95)

The present invention relates to a method of establishing intimate contact between fluids. It relates, more particularly, to a method of establishing contact between a gas and a liquid passing through a contact zone in countercurrent flow.

It is well known that in most operations wherein a gas and a liquid are brought into contact to effect the transfer of some gas (or particles carried by the gas) from the gas phase into the liquid, it is desirable to make the area of contact between the two phases as large as possible. This is usually done by subdividing the liquid/or making the liquid flow over a large surface over which the gas is passed. In commercial operations columns or towers of various construction are used for this purpose. These are, generally, so designed that a stream of liquid is introduced near the top and allowed to flow, e.g. by gravity, within the tower, while the gas is simultaneously introduced into the bottom part of the tower and circulated or allowed to rise, in countercurrent to the descending liquid.

Various types of such towers or columns are in existence. For example, in a spray tower the gas is allowed to rise in the unobstructed space within the tower while the liquid is introduced in the form of droplets (e.g. by means of spray nozzles or other atomizing devices) which fall through the gas. A low pressure drop and simple construction are advantages of this type of apparatus. However, the disadvantage of spray towers of this type is the relatively high power requirement to form the drops, which, together with the relatively small contact surface area thus produced and low degree of turbulence within the already formed drop, results in a low absorption efficiency, particularly for the less soluble gases. Thus, a packed tower is normally used except in cases where pluggage due to the existence or formation of a solid phase is a problem. In packed towers the liquid stream is made to flow by gravity over the surface of a packing material, while the gas is made to pass, e.g. in countercurrent to the liquid, through the free spaces within the packing. In this way, a large surface of contact is established between the liquid and gas. Other types of equipment used for the absorption of gas in a liquid include, e.g. the aerated tank absorber wherein the gas in the form of fine bubbles is passed through a pool of the liquid; the bubble plate or sieve plate absorber, wherein gas is forced through a perforated metal plate or through bell-shaped slotted caps, immersed in the liquid; and the like.

The packed tower, while suitable for many applications where gas absorption is desired, presents a number of disadvantages which are difficult to overcome. With the usual types of packing which may include, e.g. crushed rock, coke or specially shaped ceramic units such as Raschig rings, the tower is generally bulky, yet through-put is limited, as free passage of the fluids is provided only through the interstices and voids within the packing. When the free cross-sectional area constituted by these interstices and voids is small, the frictional pressure drop across the packing will be high and more power will be needed to circulate the gas; moreover high velocities will be required for a given or desired through-put of gas. However, the velocity of gas in such towers must be kept generally below a certain limit (which puts a limit on throughput) because when the gas velocity goes beyond this limit the gas tends to prevent the liquid from flowing down, and may even blow it out of the tower altogether. This limit is known as the flooding point. The packing in the tower tends, furthermore, to settle with time, thus reducing further free passage and accentuating the problems referred to above. In time, also, the liquid tends to channel its way through the packing, thus reducing efficiency. Clogging of the free passage areas occurs in some cases, particularly when the gases carry solid particles which settle on the packing, and for cleaning it is necessary to shut down the unit or use a duplicate unit.

A type of packed tower has been proposed wherein the packing is composed of light-weight spheres adapted to form a unitary floating bed in which the spheres, while in contact with one another yet, maintain a limited freedom of movement relative to one another. The bed, as a total unit, floats by buoyancy in the upper region of the tower where it is retained from above by a retaining grid or plate. While the action of the floating bed is substantially of the same nature as that of conventional packing, notably in that it provides a large interfacial area of contact between the liquid descending through the interstices between the spheres and the gases ascending in countercurrent to the liquid, it has advantages over the conventional systems and is particularly useful in certain circumstances. Thus, owing to the rotational and slight linear movement of the balls in the bed, no channelling occurs; solid particles carried by the liquid or gas do not settle permanently on the packing but are, on the contrary, continuously washed off and removed; plugging is thereby avoided; and there is no need for periodic shutdowns to clean or replace the packing. However, this type of packing still presents considerable resistance to the passage of the gas and liquid, and for certain gas velocities, say above 500 ft./min., the flooding point is rapidly reached. At this point the liquid no longer flows downwards across the packing but is maintained by the gas pressure, as a separate phase, in the upper region of the tower, causing practically a complete stoppage of the operation.

The present invention provides a process which is applicable to a variety of operations in which intimate contact between a liquid and a gas is desirable, e.g. where the purpose of the operation is the removal of a certain portion of a gas by its absorption in a liquid, or where it is desired to separate fine particles, either of solids or of liquids, out of a gas in which they are suspended, or where the desired end of the operation is the transfer of heat from one fluid to the other, as in the water cooling of gas, or the like. The invention is particularly useful in absorption problems involving, e.g. the passage of large volumes of gas in countercurrent flow to a liquid and where the aim is to absorb constituents of the gas in the liquid. When contact between the gas and the liquid is provided by the method of the present invention, a surprisingly high rate of absorption of the gas is obtained and exceptionally high velocities of either fluid can be used.

According to this invention, a liquid is made to flow downwards through a substantially unobstructed contact zone in countercurrent flow to a gas flowing upwards through the same zone, while a multiplicity of light-weight elements is made to move freely in random motion throughout said zone.

The contact zone is constituted by a chamber of known construction and of a suitable size wherein means are provided for introducing the liquid and for circulating the gas. The liquid is preferably introduced at the upper end of the chamber where appropriate means for introducing the liquid will be located. Such means may conveniently be constituted by a nozzle or a similar device, such device serving at the same time as a means of subdividing the liquid into a spray of desired fineness. The gas is preferably introduced in the bottom portion of the chamber whence it rises upwardly in countercurrent to the liquid and is finally removed from the chamber through an exit provided for the purpose in the top portion thereof. A number of light-weight elements of a convenient size and shape and of various densities, e.g. hollow plastic spheres of a suitable size, are maintained in the chamber in a quantity and in conditions such that during operation the individual elements will be kept in continuous random movement within the chamber.

The invention will be better understood by reference to the accompanying drawing wherein FIG. 1 represents diagrammatically a vertical section through the contact chamber of this invention, showing the light-weight elements at rest on the bottom of the chamber.

FIG. 2 represents such a vertical section showing the light-weight elements in movement during operation.

FIG. 3 shows a simple modification of the retaining grid shown in FIGS. 1 and 2.

Figure 4:
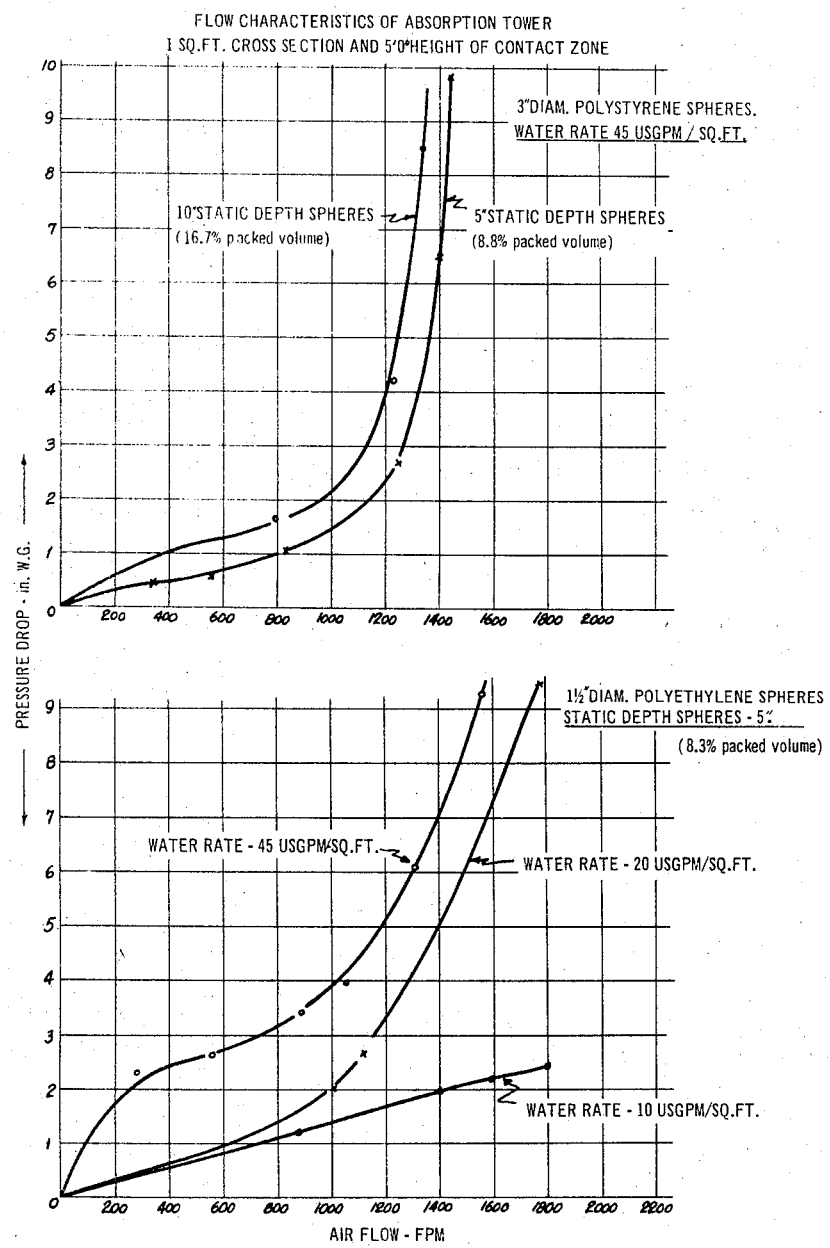
Figure 6:
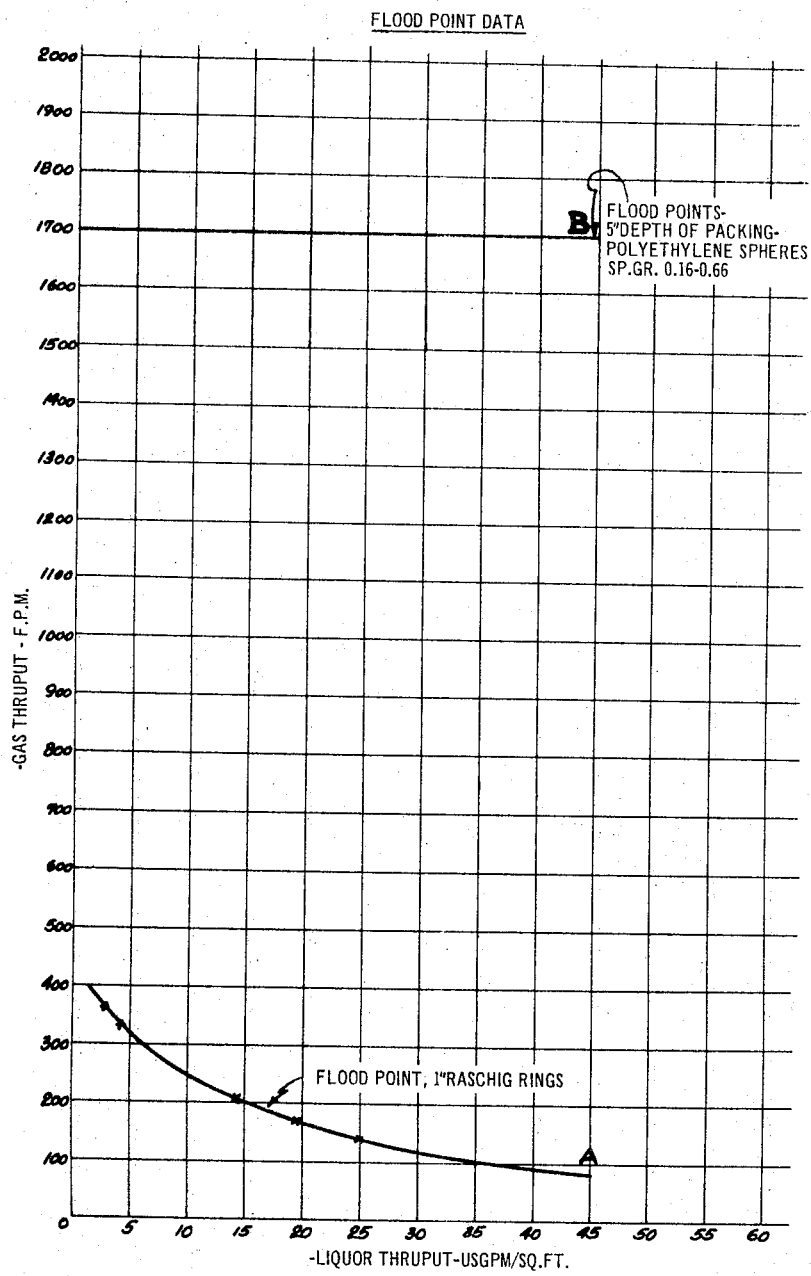

FIGS. 4, 5, 6, and 7 represent graphically certain experimental results of operation according to the present invention including comparisons with the prior art.

Referring now to FIGS. 1 and 2, the apparatus consists of a tower 1 of a known type suitable for passing fluids therethrough in countercurrent flow. The tower is of a suitable height and of a horizontal cross-section which may be rectangular or circular or of any other geometrical form. Part of the tower constitutes contact chamber 2 which is limited at its upper end by a grid or perforated plate 4 and at its lower end by similar grid or plate 5. The grids may be made of any suitable material and will preferably have openings of such size as to offer the least possible resistance to the flow of gas or liquid. The function of the lower grid is principally one of support for the light-weight elements 6 when the apparatus is not in operation, while the upper grid serves principally to retain the light-weight elements within the chamber, and to prevent their escape, when the apparatus is in operation. The upper grid could, conceivably, be dispensed with altogether on condition that the chamber is made high enough to prevent the escape of the light-weight elements from the chamber during operation. The grids will generally extend horizontally across the tower, however, in some cases it may be advantageous to use for upper grid 4 a convex grid sloping upwards towards the centre as illustrated in FIG. 3.

The packing 6 consisting of light-weight spherical or spheroidal elements is shown in FIG. 1 in static condition, i.e. when the apparatus is not in operation, a few layers of said packing being piled up on grid 5 of the apparatus. It will be noted that only a relatively small part of the volume of the chamber is occupied by the packing. The same packing 6 is shown in FIG. 2 as it appears during operation, distributed at random throughout the chamber space.

The gas is admitted at the bottom part of the apparatus, through pipe 8 entering section 9 of the apparatus below grid 5. The liquid is admitted into the upper section 3 of the apparatus above grid 4, through pipe 12 and distributing device 13. The gas is withdrawn from the upper portion of the apparatus through mist eliminator 11 and gas outlet pipe 14; the liquid is withdrawn e.g. through outlet pipe 15 in the bottom part.

The motion of the individual elements within the chamber will occur under the influence of various forces acting upon them, such forces including primarily the gravity pull, the pressure exerted by the rising gas and the impact created by the descending liquid on individual elements. It is a necessary feature of this invention that the total effect of these (and other) acting forces be to maintain the light-weight spherical elements in individual random motion, in which motion the elements travel freely over relatively long linear distances, say at least of the order of several times their diameter. A particular result of such motion is that the elements move at random through substantially the complete interior space of the chamber, and, in any event, do not form a loose ensemble or the unitary floating bed of the prior art in which bed the light-weight elements are contiguously aligned in close contact with one another and suspended by buoyancy in the upper region of the chamber.

The light-weight elements may be of a variety of shapes and sizes and made of various materials. They may conveniently consist of plastic hollow spheres, e.g. hollow balls, formed with a thin polyethylene wall or skin; or of spheres or spheroidal shapes, hollow or otherwise, made of foamed polystyrene or other low density plastics or other material. These light-weight elements will be referred to from time to time in this specification as "spheres," and it is to be understood that no strict limitations as to the shape of the elements is intended by the use of said term. The spheres may be of a size up to about 4" in diameter, but will generally be smaller, the optimum size being best selected empirically and in relation to the total size of the chamber in which they are to be used. These spheres will generally be of low density, so that they will not, e.g. settle by gravity on the bottom of the chamber, but on the contrary will respond readily to the action of the various forces within the chamber. By density of the elements I mean the apparent density of the individual spheres or spheroidal shapes, i.e. the weight of the element divided by the volume defined by its outer wall. To be of use in this invention, the densities of individual elements will be greater than the density of the gas, and less than the density of the liquid, used in the operation. As a practical numerical range, specific gravities between about 0.01 and about 0.9, will be generally selected.

It has been found desirable to employ spheres of different densities in any given installation, since such a mixture of "heavier" or "lighter" spheres results in a more pronounced and more controlled random movement of the spheres. It is preferable to have in such cases a relatively broad and generally random distribution of densities. A simple expedient for achieving a random distribution of densities within a desirable range is, for example, to employ hollow plastic spheres, such as polyethylene balls, a certain number of which have tiny holes formed in the thin plastic skin constituting their outer wall. The liquid used in the operation (or any other suitable liquid) will penetrate in various amounts through the pinholes into the spheres, providing in this simple manner a random variety of densities within the desired range.

It is necessary for the working of the present invention that the spherical elements remain in random motion, and control of the operation is necessary in order to ensure this type of motion. I found that the factors primarily affecting the movement of the spherical elements, given their individual size and density, are (a) the quantity of elements relative to the interior space of the chamber, and (b) the flow velocities of both the gas and the liquid. Thus, for elements of any given size or density there will be a critical limit with respect to the number of such spheres that can be used in a chamber of given volume. It will be convenient to define this critical limit in terms of the relative portion of chamber space which is filled by the sphere in static conditions, i.e. when the spheres remain piled up in layers on the bottom of the chamber. Rendering the same concept in different words, we could define the critical limit in terms of the relative height of the static bed of the elements, i.e. the height of the bed of spheres when evenly piled up in layers on the bottom of the chamber relative to the total height of the chambers; differently still, we could define the critical limit in terms of the relative height of the "free board," the latter terms denoting the space between the upper most limit of the spheres in the static bed and the upper grid.

I have found that the apparent packed volume of the spheres in static condition (which will be referred to as the volume of packing) should not in any event exceed 50% of the volume of the contact zone and in many cases, depending largely on the density of the spheres, should be less. (By apparent packed volume of the spheres I understand the volume of the spheres including the voids between them.) In other words, the relative height of the static bed of the elements should not be more than 50% of the height of the contact chamber and in many cases, depending largely on the density of the spheres, should be less; or still differently stated, the relative height of the free board should be 50% or more of the height of the contact chamber. Furthermore, there will be in practice a certain minimum height of free board (in absolute terms), below which random motion of spheres will be difficult or impossible to obtain: I have found that this minimum height of the free board is between 6 inches and 3 feet, depending on the density of the spheres, velocity of the gas and velocity of the liquid. When the critical proportion of packing, as herein above stated, is exceeded, it will be difficult or impossible to maintain the spheres in random motion because the spheres, as soon as they are lifted by the gas stream, will tend to rise in a body into the upper region of the chamber where they will come to rest against the grid or plate defining the upper limit of the chamber. I will call this phenomenon "plastering," the spheres becoming "plastered" to the ceiling of the chamber. When this phenomenon occurs, a floating bed is formed of the known type referred to above, wherein the movement of individual spheres, while still quite free as to rotation, is severely restricted as to linear travel by the mass of surrounding spheres. When this happens, the pressure drop across the mass of spheres will increase and be of such an order that with the gas and liquor flows contemplated in the practice of this invention, the flooding point will be rapidly reached and operation according to this invention will be impossible.

It will be readily understood that the maintenance of the desired type of motion of the individual elements will depend very closely on the fluid velocities, and particularly on the velocity of the gas flow. With very low gas velocities there may not be sufficient "lift" for the spheres to get off the bottom of the chamber altogether, particularly so where the densities of the spheres are high and/or where the rate of liquid flow, acting in the opposite direction to that of the gas flow, is relatively high. On the other hand, where the gas velocities are high, there is the possibility of "plastering" some or all of the spheres, even where their quantity is well within the critical value for the volume of packing. Thus, working with 3" diameter spheres made of foamed polystyrene (sp. gr. about 0.023) and with a liquor rate of about 45 U.S. gallons per minute, I have found that for a volume of packing of 8.3% there was little or no motion of the spheres up to gas velocities of about 350 f.p.m., while a tendency to plastering was pronounced at a gas velocity of close to 1400 f.p.m. (The gas used in this experimental run was air, and the liquid water.) When the volume of packing was increased to 16.7% the plastering point was reached at velocities of slightly over 1200 f.p.m. With polyethylene spheres 1½" diameter and a random sp. gr. between 0.155 and 0.655, a liquid flow of about 45 U.S. g.p.m. and a volume of packing 8.3%, motion of the spheres began at gas velocities of about 550 f.p.m., but no plastering point was reached with velocities up to about 1500 f.p.m. (the latter being the maximum velocity that could be reached in the given conditions). With polyethylene spheres of this size and density no plastering occurred even at lower liquid flow rates (e.g. 20 U.S. g.p.m. and 10 U.S. g.p.m.) and at gas velocities up to 1800 f.p.m.; but in an experimental dry run (liquid flow rate equal zero), plastering of the spheres began at gas velocities of about 2700 f.p.m.

It will be obvious that where and when plastering occurs (with spherical elements of given density and with a given volumn of packing) a simple expedient is to decrease slightly the velocity of the gas, or increase temporarily the flow of the liquid, or both. The use of a convex grid, as illustrated in FIG. 3, provides another way of controlling plastering. With a grid of this shape, when plastering occurs, the spherical elements will tend towards the raised centre of the grid to remain plastered there. When this happens, a simple expedient is to cover the apex of the grid with cover 16 which is made to fit the central portion of the grid while leaving the major peripheral portion thereof unobstructed to the passage of gas. The spheres plastered in the centre will then begin to fall by gravity towards the bottom and will again be drawn into the turbulent random motion within the chamber. The cover 16 may then again be removed.

A particular advantage of the method of this invention is that the pressure drop across the operational height of the chamber for various gas velocities is very much less than the pressure drop for corresponding velocities in the packed towers of the prior act. Consequently gas and liquid velocities of an entirely different order from those previously known, can be used in this invention. Simultaneous gas flows of up to 1500 f.p.m. and liquor flows up to 70 U.S. g.p.m. per sq. ft. of cross section can be maintained without flooding and with a total pressure drop within the range of between 2" and 10" water gauge, the actual value of the pressure drop depending on factors such as the height of the contact chamber, the density and size of spheres and the volume of packing. Diagrams showing the pressure drop for various gas velocities for given liquid flows will be found in FIG. 4. Thus, working with hollow polyethylene spheres (1½" diameter and sp. gr. between 0.155 and 0.655) and with a volume of packing 8.3%, I have found that for liquid flows of 45 U.S. g.p.m. gas velocities up to 1550 f.p.m. could be used before flooding occurred; while for liquid flows of the order of 10 to 20 U.S. g.p.m. a velocity of 1800 f.p.m. could be reached before flooding occurred. It will be appreciated that gas velocities in excess of the order of 1600–1800 f.p.m. are sufficient to hold up liquid in an open pipe (see "The Meteorological Glossary," by the Meteorological Office of the Air Ministry, published by Chemical Publishing Co., 1940, p. 156). It will be seen from comparisons given herein below that the gas and liquid flow rates which can be used in accordance with the present invention are far in excess of the highest flow rates possible in conventional packed towers where flooding occurs for gas velocities of the order of 100–400 f.p.m. combined with liquid flows not exceeding 40 U.S. g.p.m. It will be seen, similarly, that the gas and liquid flow rates suitable for use in the present invention far exceed the flow rates that can be used with the floating bed technique of the prior art. The gas velocities used with the present invention are generally in the range of about 300–1800 feet per minute, while the liquid rate is generally in the range of from about 5 to 100 U.S. gal. per min. per sq. ft. Preferably these rates will be in the range of 550 to 1700 feet per minute and 10 to 75 U.S. gal. per min. per sq. ft. respectively. As a result of such higher velocities, not only is throughput (or capacity of the tower), considerably increased but also absorption efficiency is markedly improved, and so is recovery of the gas constituents which it is the purpose of the operation to recover.

As an example of useful application, the process of the present invention was used for the absorption of carbon dioxide in alkaline liquor. In this operation the objective was the carbonation of process liquor from an initial pH of 11.0–12.5 to a final pH of 9.0–9.2 with a flue gas containing carbon dioxide, approximately 16% by volume. The process liquor consisted essentially of a sodium hydroxide-sodium carbonate solution, and some dissolved organic (wood) solids. No attempt is made in this operation to recover completely the carbon dioxide from the flue gas; rather, excessive amounts of flue gas are normally employed (consistent with tower size and power requirements) to maintain the partial pressure of carbon dioxide as the driving force and thereby increase the capacity of any absorption tower.

The apparatus used was one substantially as described before, and consisted of a chamber one square foot in cross section and about ten feet high. The contact zone within the chamber was defined by two horizontal grids, a lower grid and an upper grid, five feet apart. Polyethylene spheres of a diameter 1½″ and specific gravities ranging between 0.16 and 0.65, were placed on the bottom grid; the number of spheres (i.e. the volume of packing) was varied from run to run. Process gas containing carbon dioxide was introduced at the bottom of the chamber and was allowed to flow upwards, through the bottom grid, through the contact zone and through the upper grid to an exhaust leading out to the atmosphere. The liquid was introduced in spray form at the top of the chamber and was allowed to flow downward through the upper grid and down through the contact zone, in countercurrent to the rising gas and was collected (with the dissolved solute therein) in the bottom part of the chamber and pumped to process. Measurements of gas and liquid flow, of concentration of CO in the inlet and outlet liquid were made to determine the partial pressure of $CO_2$ (the driving force), the quantity of gas absorbed, and the efficiency of recovery. The coefficient of absorption $$K_g a = \frac{M}{V \Delta P}$$

(where M is solute gas absorbed in lb. mols/hr., V is volume of packing in cu. ft. and $\Delta P$ is the average partial pressure of the solute gas in atm.) is taken as a measure of efficiency of absorption, the dimensions of said coefficient being $$\frac{\text{lbs. mols/hr.}}{\text{cu. ft./atm.}}$$

Studies by several investigators (see Absorption and Extraction by Sherwood & Pigford, 2nd edition, 1952, McGraw-Hill Book Company, p. 364) on the absorption of carbon dioxide in sodium carbonate solution in packed columns indicate this absorption to be a liquid film controlled system, i.e. a system wherein increased liquid rates will result in an increased absorption coefficient, whereas variation in gas rates will have little or no effect on the absorption coefficient. In such an operation, however, high gas rates are still beneficial for maintaining a high solute partial pressure driving force which would increase the absorption capacity of a tower. The absorption coefficient in this case can be represented as $K_g a = C L^x$, where L is the liquid rate in lb./hr./sq. ft. of cross section, and C and $x$ are constants characteristic of the packing and are determined experimentally. The absorption coefficient is also affected by other factors or conditions of operation, such as temperature (the coefficient increasing with temperature), concentration of carbonate and percentage of bicarbonate (the coefficient decreasing with the increase in both of the factors).

TABLE 1.—$CO_2$ ABSORPTION CAPACITY OF 1 SQ. FT. ABSORPTION TOWER USING LOW DENSITY PACKING (1½″ POLYETHYLENE SPHERES OF SP. GR.—0.16—0.66)

| Run No. | Packing (Static Basis) | | Apparent Packed Volume (Percent) | Gas Flow Linear, ft./min. | Liquor Flow, U.S. gals./min. | Pressure Drop In. Water gauge | $CO_2$ Pick-up | | Abs. Coeff., $K_g a$, lb. mols/hr./cu. ft./atm. |
|---|---|---|---|---|---|---|---|---|---|
| | Height, inches | Volume, cu. ft. | | | | | Lb./hr./sq. ft. | Lb./hr./sq. ft./in. W.G. Pressure Drop | |
| RANDOM SPHERE MOTION OF PRESENT INVENTION (TURBULENT CONTACT ACTION) | | | | | | | | | |
| 1 | 5.0 | 0.42 | 8.3 | 1,000 | 6.8 | 2.0 | 12.9 | 6.45 | 7.0 |
| 2 | 5.0 | 0.42 | 8.3 | 1,000 | 13.9 | 2.5 | 17.5 | 7.01 | 9.5 |
| 3 | 5.0 | 0.42 | 8.3 | 400 | 13.9 | 2.0 | 17.5 | 8.75 | 9.5 |
| 4 | 10.0 | 0.83 | 16.7 | 400 | 13.9 | 3.0 | 21.5 | 7.17 | 5.9 |
| 5 | 15.0 | 1.25 | 25.0 | 400 | 13.9 | 4.0 | 26.0 | 6.50 | 4.7 |
| 6 | 20.0 | 1.67 | 33.4 | 400 | 13.9 | 7.0 | 32.0 | 4.57 | 4.3 |
| 7 | 25.0 | 2.08 | 41.7 | 400 | 13.9 | 8.0 | 36.0 | 4.50 | 3.9 |
| 8 | 30.0 | 2.5 | 50.0 | 400 | 13.9 | 10.0 | 41.0 | 4.10 | 3.1 |
| RESTRICTED SPHERE MOTION (FLOATING BED ACTION) | | | | | | | | | |
| 9 | 36.0 | 3.0 | 60.0 | 400 | 13.9 | 25.0 | 19.0 | 0.76 | 1.4 |
| 10 | 48.0 | 4.0 | 80.0 | 400 | 13.9 | 28.5 | 23.0 | 0.81 | 1.3 |
| 11 | 58.0 | 4.83 | 96.7 | 200 | 13.3 | 35.0 | 26.0 | 0.74 | 1.2 |
| CONVENTIONAL STATIC PACKING USING COKE (12.6 SQ. FT. CROSS SECTION, 37 LINEAR FT. PACKING) | | | | | | | | | |
| 12 | | | | 54 | 1.2 | 10.0 | 8.3 | 0.83 | 0.041 |

The results of the experiments are set out in Table 1. Runs 1 to 11 show the $CO_2$ absorption capacity of an absorption tower of 1 sq. ft. cross section area packed with 1½″ polyethylene spheres of specific gravity 0.16 to 0.66. Runs 1 to 8 inclusive were made according to the process of the present invention, and runs 9, 10 and 11 were made according to the floating bed technique as disclosed in French Patent 1,234,396 to A. W. Kielback. An additional run no. 12 is shown in which a conventional coke packed tower now in existence in the plant (12.6 sq. ft. cross section, 37 linear feet packing) has been used.

The data for 400 ft./min. linear gas velocity and 13.9 U.S. gals./min. liquor flow are plotted in FIGS. 5a, b, c, and d.

It will be noted from FIG. 5a that with 8% to 50% apparent packed volume the pressure drop rises in a continuous manner from 2 inches to 10 inches water gauge, the relationship being characteristic of the random motion of spheres of the present invention. When the apparent packed volume is increased from 50% to 60% the spheres rise to the top of the grid zone and there is a sharp increase in pressure drop to 25 inches water gauge. With 60% to 80% and greater apparent packed volume a new relationship characteristic of the floating bed technique is established. (In run 11, with only 3 inches free space above the apparent packed volume the high pressure drop which developed resulted in a reduction of gas flow from 400 linear ft./min. to 200 linear ft./min. because of the limiting capacity of the fan. For this reason the point for run 11 (in Table 1) is shown in FIG. 5a with an arrow since with 400 linear ft./min. the pressure droy would be very much higher.)

FIG. 5b shows the $CO_2$ pick-up in lb./hr./sq. ft. of cross section and FIG. 5c shows the $CO_2$ pick-up in lb./hr./sq. ft./in. w.g. pressure drop. These curves also show clearly the discontinuity between the effect obtained in the range of random sphere motion of the present invention and the one in the range of restricted sphere motion (floating bed technique). A comparison of runs 3 and 10 in which the apparent packed volumes are 8.3% and 80% respectively show values of 8.75 and 0.81 lb./hr./sq. ft./in. w.g. pressure drop. There is, thus, more than a 10 fold gain in $CO_2$ absorbed per unit pressure drop when operating with random sphere motion compared with the floating bed technique.

FIG. 5d shows the absorption coefficient in relation to packed volume again indicating the markedly better absorption performance obtained with random sphere motion.

The data for the coke packed tower are shown in run 12. It is clear that the $CO_2$ pick-up per unit pressure drop in the coke packed tower, while of the same order as that obtained with the low density packing when operated with restricted motion of spheres, is considerably less than that obtained with random motion of spheres according to the present invention.

In the design and operation of a conventional packed tower an optimum gas velocity is usually selected by balancing capital and operating costs. For example, if a higher gas velocity is selected, the tower diameter (for a given throughput) can be smaller, but the cost of pumping the gas against the tower pressure drop will increase. But a definite ceiling on gas velocities will be imparted by the flooding point velocities and, in practice, the velocities used will, in most cases where a continuous operation is run, be no more than 40 to 50 percent of the flooding velocities, so as to allow for plugging of packing (See Sherwood & Pigford, op. cit. p. 245).

velocities of 1150 f.p.m. have been used, with a total pressure drop of 9.7" w.g. When polystyrene spheres were used (1½" diameter, 0.023 sp. gr.) in the same conditions and with the same fluid velocities, the pressure drop was 4.8" w.g.

TABLE III.—A COMPARISON OF A CONVENTIONAL PACKED TOWER WITH CONTACT ABSORBER OF PRESENT INVENTION FOR THE SAME TERMINAL CONDITIONS

|  | Contact Absorber of present invention | Tower Packed with 1" Raschig Rings |
|---|---|---|
| Gas rate: |  |  |
| C.f.m | 1,000 | 1,000 |
| F.p.m | 1,000 | 182 |
| Lb./hr./sq. ft | 3,950 | 700 |
| Tower cross-section: |  |  |
| Sq. ft | 1 | 5.5 |
| Diameter, ft | 1.13 | 2.65 |
| Liquor rate: |  |  |
| Lb./hr./sq. ft | 6,900 | 1,250 |
| U.S. g.p.m./sq. ft | 13.8 | 2.5 |
| U.S. g.p.m | 13.8 | 13.8 |
| $CO_2$ pick-up: |  |  |
| Lb./hr | 23 | 23 |
| M mols/hr | 0.36 | 0.36 |
| Partial pressure driving force, P-atm. |  |  |
| $CO_2$ | 0.100 | 0.100 |
| Absorption coefficient Kga, lb. mols. |  |  |
| $CO_2$/hr./cu. ft./atm | 3.60 | 0.055 |
| Required volume of packing, cu. ft | 1.0 | 65.5 |
| Height of packing, ft | (¹) | 12' |
| Pressure drop in $H_2O$ | 5 | 5 |

¹ 1' in 5' absorption zone.

The efficiency of the method of this invention is shown clearly in Table III which provides a comparison between said method and a conventional tower packed with 1" Raschig rings. It can be seen that to obtain the same results in terms of total gas pick-up for the same terminal conditions, the conventional tower must have a cross sec-

TABLE II. FLOODING VELOCITIES FOR 1" RASCHIG RING

| Liquid Rate | | Flooding Gas Velocities | | Pressure Drop at Flood Point in. $H_2O$/ft. Packing | Recommended Gas Velocities | | Pressure Drop at recommended velocities in. $H_2O$/ft. Packing |
|---|---|---|---|---|---|---|---|
| Lb./hr./sq. ft. | U.S. g.p.m./sq. ft. | Lb./hr./sq. ft. | F.p.m. |  | Lb./hr./sq. ft. | F.p.m. |  |
| 1,250 | 2.5 | 1,400 | 363 | 1.9 | 700 | 182 | 0.40 |
| 2,050 | 4.1 | 1,240 | 322 | 1.8 | 620 | 161 | 0.38 |
| 7,200 | 14.4 | 810 | 210 | 1.6 | 405 | 105 | 0.28 |
| 9,950 | 19.9 | 660 | 171 | 1.5 | 330 | 86 | 0.28 |
| 12,500 | 25.0 | 540 | 140 | 1.4 | 270 | 70 | 0.35 |

In Table 11 the flooding velocities for varying liquid rates in a conventional tower using 1 in. Raschig rings are set out for a gas containing 16% carbon dioxide on a dry basis and absorbed at 135° F. The data of Table 11 are illustrated in curve A of FIG. 6, and in the same figure, for comparison, the flooding point range for operation in accordance with this invention (using polyethylene spheres of sp. gravity range 0.16 to 0.66 and a volume of packing 8.3 percent) is represented by line B. Line B, shows that the flood points at a gas throughput of 1700 f.p.m. are not affected by the liquid throughput over the range investigated. The figure of 1700 f.p.m. will vary somewhat being dependent on the physical characteristics of the two fluids. It will be appreciated that the whole range of velocities lying above curve A and extending between curve A and curve B, and which cannot be used in conventional packed towers, can be used with advantage in the method of the present invention. For example, runs have been made with polyethylene spheres (1½" diameter, sp. gr. 0.16 to 0.66), and a packing volume of 16.7% liquid velocities of 40 U.S. g.p.m. and gas tion 5.5 times as large and a height of packing twelve times as large (and a volume of packing 65 times as large) as the absorber of this invention. This clearly illustrates the high efficiency of this equipment.

In another example of useful application, the process of the present invention has been used for the absorption of sulphur dioxide in sodium hydroxide to produce sodium bisulphite liquor for use in a pulping process. In this system both liquid and gas films are controlling and therefore increased gas and liquid rates will result in an increased absorption coefficient. Liquor velocities of up to 45 U.S. g.p.m. have been employed with gas velocities of 1200–1300 f.p.m., without flooding or excessive pressure drop, and with high recovery efficiency. In this example multiple-zone operation was used for some runs, the fluids passing through two or more contact zones arranged in series; such arrangement has proved beneficial, e.g. for absorption capacity and pressure drop, the latter being less than in single bed operation with the same total quantity of packing. The results of several runs in this operation are summarized in Table IV.

TABLE IV-A.—ABSORPTION OF $SO_2$ IN NaOH TO PRODUCE $HaHSO_3$ LIQUOR (SINGLE BED OPERATION)

| Height of Contact Zone (feet) | Apparent Packed Volume, percent | Total Static Packed Volume, cu. ft. | Gas Flow, f.p.m. | Liquor flow U.S. g.p.m./ sq. ft. | Pressure Drop, in. w.g. | Inlet $SO_2$, percent | Outlet $SO_2$, percent Y | Recovery Efficiency, percent | $SO_2$ Pickup, lb./hr. | Abs.Coeff. Kga, Lb. mols/hr. cu. ft./atm. |
|---|---|---|---|---|---|---|---|---|---|---|
| POLYETHYLENE SPHERES 1½″ DIAMETER, SP. GR. 0.16–0.66 | | | | | | | | | | |
| 5 | 16.7 | 0.834 | 570 | 28 | 4.1 | 17.0 | 8.0 | 57.6 | 530 | 85 |
| 5 | 16.7 | 0.834 | 840 | 28 | 4.6 | 17.3 | 7.0 | 63.7 | 860 | 140 |
| 5 | 16.7 | 0.834 | 1,150 | 40 | 9.7 | 16.6 | 2.4 | 85.6 | 1,760 | 450 |
| 5 | 25.0 | 1.25 | 930 | 28 | 5.5 | 16.2 | 3.7 | 80.6 | 1,120 | 200 |
| 5 | 25.0 | 1.25 | 1,090 | 45 | 9.2 | 14.2 | 0.2 | 99.0 | 1,470 | 560 |
| POLYSTYRENE SPHERES 3″ DIAMETER, SP. GR. 0.023 | | | | | | | | | | |
| 5 | 16.7 | 0.834 | 970 | 40 | 3.2 | 16.6 | 6.6 | 60.2 | 1,080 | 190 |
| 5 | 16.7 | 0.834 | 1,050 | 38 | 3.9 | 16.9 | 5.7 | 66.3 | 1,300 | 270 |

TABLE IV-B.—ABSORPTION OF $SO_2$ IN NaOH TO PRODUCE $NaHSO_3$ LIQUOR

| Height of Contact Zone (feet) | | | Apparent Packed Volume, Percent | | | Total Static Packed Volume, cu. ft. | Gas Flow, f.p.m. | Liquor flow, U.S. g.p.m. sq. ft. | Pressure Drop, in. w.g. | Inlet $SO_2$, Percent | Outlet $SO_2$, Percent | Recovery Efficiency, Percent | Pickup, lb./hr. | Abs. Coeff. Kga., lb. mols/hr. cu. ft./atm. |
|---|---|---|---|---|---|---|---|---|---|---|---|---|---|---|
| 1st | 2nd | 3rd | 1st | 2nd | 3rd | | | | | | | | | |
| POLYETHYLENE SPHERES 1½″ DIAMETER, SP. GR. 0.16–0.66 (DOUBLE BED OPERATION) | | | | | | | | | | | | | | |
| 3 | 1.5 | ------ | 13.9 | 16.7 | ------ | 0.67 | 1,100 | 45 | 6.1 | 15.7 | 1.6 | 90.0 | 1,350 | 510 |
| 5 | 4 | ------ | 16.7 | 9.3 | ------ | 1.25 | 1,050 | 40 | -------- | 14.2 | 0 | 100 | 1,590 | 600 |
| 5 | 4 | ------ | 16.7 | 9.3 | ------ | 1.25 | 1,220 | 37 | 9.9 | 15.4 | 1.0 | 93.6 | 1,900 | 470 |
| POLYETHYLENE SPHERES 1½″ DIAMETER, SP. GR. 0.16–0.66 (TRIPLE BED OPERATION) | | | | | | | | | | | | | | |
| 3 | 2 | 8 | 22.2 | 12.5 | 5.2 | 1.33 | 1,400 | 48 | 12 | 15.0 | 0 | 100 | 2,000 | 980 |

In yet another example of application of the present invention involving the absorption of sulphur dioxide in a magnesium hydroxide slurry, liquor velocities of over 75 U.S. g.p.m. with gas velocities of over 1000 f.p.m. have been used.

In yet another example of application, the contact chamber of this invention was used to effect the cooling and dehumidification of hot moist air by passing it in countercurrent to cooling water. These heat and mass transfer studies have been carried out in a tower of one sq. ft. cross section, substantially of the type described herein-above, but consisting of three zones arranged vertically in series, each four feet high, and each having a packing five inches deep (when static) consisting of polyethylene spheres 1½ inch diameter and of a sp. gr. 0.16–0.66. The flow, the temperature and the humidity of the inlet air, and the temperature of the inlet and exit water, were all measured. The results of these tests are summarized in Table V which shows a transfer rate appreciably higher than the rates reported in the literature for conventional towers. The results of these tests are further graphically illustrated in FIG. 7.

TABLE V.—HEAT AND MASS TRANSFER DATA (HOT SATURATED AIR AND COOLING WATER)

Tower cross section—1 sq. ft.
Packing arrangement—three 4-ft. zones with a 5″ depth of 1½″ diameter polyethylene spheres (random sp. gr.—0.16 to 0.66) per zone. Total volume packing—1.25 cu. ft.

| Literature Valves | Inlet Water Flow, U.S. g.p.m./sq. ft. | Inlet Gas Flow, f.p.m. | Pressure Drop Across Packing, in. w.g. | Water Temp., °F. | | Air Temp., °F. | | $H_2O$ Vapour Condensed, lb./hr. | Sensible Heat Transf. Coeff. Ha= B.t.u./hr. cu. ft./°F. | Mass Transf. Coeff. Kga.= mols/hr. cu. ft./atm. | Total heat Transfer, B.t.u./hr. sq. ft./°F. in. w.g. |
|---|---|---|---|---|---|---|---|---|---|---|---|
| | | | | In | Out | In | Out | | | | |
| | | 790 | 6.0 | 34 | 74 | 168 | 37 | 720 | 2,900 | 530 | 5,300 |
| | 42 | 970 | 6.6 | 34 | 82 | 167 | 38 | 860 | 4,500 | 620 | 6,000 |
| | | 1,170 | 7.3 | 34 | 91 | 167 | 40 | 1,040 | 5,200 | 730 | 6,300 |
| | | 1,290 | 8.1 | 34 | 100 | 169 | 40.5 | 1,200 | 7,100 | 820 | 6,900 |
| | | 460 | 6.8 | 34 | 54 | 192 | 39 | 700 | 1,600 | 300 | 2,900 |
| | 88 | 820 | 7.8 | 34 | 60 | 178 | 35 | 940 | 4,800 | 630 | 5,900 |
| | | 1,060 | 8.7 | 34 | 64 | 175 | 34.1 | 1,130 | 8,500 | 930 | 9,800 |
| | | 1,230 | 9.8 | 34 | 68 | 174 | 34.1 | 1,280 | 10,500 | 1,080 | 10,400 |
| Atmospheric tower [1] | | 500 | | | | | | | 100 | | |
| Natural or Forced draft tower [1] | 6 | 500 | | | | | | | 88 | | |
| Coke packed tower [1] | 2 | 500 | | | | | | | 35 | | |
| Coke packed tower, 3″ coke [2] | 1.3–3.6 | 230 | | | | | | | | 60 | |

[1] P.276—Elements Chemical Engineering, Badger and McCabe, 2d Edition.
[2] P.171—Absorption and Extraction, Sherwood, 1st Edition.

It will be evident that the process of the present invention is applicable to many and various operations involving contact between a liquid and another fluid, such as in absorption, scrubbing, purification, heat exchange and the like, where intimate contact between the fluids is desirable and where contact between the fluids is achieved by passing the same in countercurrent through a contact zone.

What I claim is:

1. A process for mutually contacting a liquid and a gas in a contact zone having a bottom retaining grid which comprises
   (1) introducing into said contact zone a preselected plurality of light weight spheres of predetermined specific gravity intermediate the specific gravity of said liquid and said gas and having a total packed volume of at most about 50% of the volume of said contact zone, said contact zone having a minimum freeboard height of at least six inches,
   (2) maintaining a gas flow upwardly through said contact zone, while
   (3) maintaining a flow of said liquid through said contact zone countercurrent to said gas flow, and
   (4) balancing the pressure exerted by said gas flow and the impact created by said descending liquid with the force of gravity exerted on said spheres so that (a) said spheres are maintained in a free random motion with a linear free path greater than the diameter of the said spheres throughout the said contact zone and in at least twice the volume occupied by said spheres when in static condition, and (b) the free downward flow of said liquid is maintained without flooding.

2. A process as defined in claim 1 wherein the flow rate of said gas is between about 300 to 1800 feet per minute and the countercurrent flow of said liquid is between about 5 and 100 U.S. gallons per minute per square foot of cross-section of said contact zone.

3. A process as defined in claim 1 wherein the flow rate of said gas is between about 550 to 1700 feet per minute and the countercurrent flow of said liquid is between about 10 and 75 U.S. gallons per minute per square foot of cross-section of said contact zone.

4. A process according to claim 1 wherein the light weight spheres are substantially spherical bodies less than 4 inches in diameter and of a specific gravity within the range between 0.01 and 0.9.

5. A process according to claim 1 wherein the light weight spheres are substantially spherical bodies less than 4 inches in diameter and of a random variety of specific gravities within the range between 0.01 and 0.9.

6. A process of contacting a gas and a liquid in countercurrent flow comprising: passing a gas upwardly through a contact zone at a rate of 300–1800 lineal feet per minute and a liquid downwardly at between about 5 and 100 U.S. gallons per minute per square foot of cross-section of said contact zone, in countercurrent flow; maintaining a plurality of light weight spheres within said contact zone, the total apparent packed volume of said spheres being less than 50% of the volume of said contact zone; and maintaining and coordinating the relative flow rates of said gas and said liquid so that said spheres are continuously and randomly dispersed and re-dispersed in a state of free random linear motion throughout said contact zone, whereby said contact of said gas and liquid in said contact zone is achieved.

7. A process according to claim 6 wherein the light-weight spheres are substantially spherical bodies less than 4 inches in diameter and of a specific gravity less than the specific gravity of the liquid and more than the specific gravity of the gas.

8. A process of contacting a gas and a liquid comprising: passing a liquid downwardly through a contact zone, passing a gas upwardly in countercurrent flow to said liquid through said zone, maintaining the velocities of said liquid and said gas being respectively between 5 and 100 U.S. gallons per minute per square foot of cross-section and between 300 and 1800 feet per minute, maintaining in said zone a plurality of light-weight spheres of diameter less than 4 inches and of specific gravity in the range of 0.01 to 0.9, the total apparent packed volume of said spheres being less than 50% of the volume of said zone and coordinating said velocities of said gas and said liquid so that said spheres are continuously, randomly dispersed and re-dispersed in random free linear motion throughout said zone by the passage of said gas and liquid through said zone.

9. A process as defined in claim 8, wherein the flow rate of said gas is between about 550 to 1700 feet per minute and the downward flow of liquid is between about 10 and 75 U.S. gallons per minute per square foot of cross-section of said contact zone.

10. A process for effecting a transfer of mass or heat energy between a gas and a liquid which comprises passing a liquid downward through a contact zone, passing a gas upward in countercurrent flow to said liquid through the said zone, maintaining in said zone a multiplicity of light-weight spheres of a diameter less than 4 inches and of varying specific gravities within the range between 0.01 and 0.9, and between the specific gravity of said gas and said liquid, the number of said spheres in said zone being such that the total packed volume of said bodies is not more than fifty percent of the total volume of said zone, the velocities of passage of said liquid and of said gas between 5 U.S. gallons per minute and 100 U.S. gallons per minute per square foot cross-section and between 300 feet per minute and 1800 feet per minute, whereby said spheres, impelled by the balanced interaction of the impact therein of the downward passage of said liquid, the force of gravity, and the upward pressure of said gas flow are maintained in random motion throughout said zone.

References Cited

UNITED STATES PATENTS

| 1,864,966 | 6/1932 | Vieser | 261—121 |
| 2,508,394 | 5/1950 | John | 261—95 |
| 3,122,594 | 1/1964 | Kielback | 261—94 |
| 3,219,324 | 11/1965 | Williams et al. | 261—95 |

HARRY B. THORNTON, *Primary Examiner.*

RONALD R. WEAVER, *Examiner.*

FRANK W. LUTTER, D. RIESS, *Assistant Examiners.*